(12) United States Patent
Watanabe

(10) Patent No.: US 6,642,630 B2
(45) Date of Patent: Nov. 4, 2003

(54) MULTI-OUTPUT SWITCHING POWER SOURCE CIRCUIT

(75) Inventor: Kiyohiko Watanabe, Miyagi (JP)

(73) Assignee: NEC Communication Systems, Ltd., Tokyo (JP)

( * ) Notice: Subject to any disclaimer, the term of this patent is extended or adjusted under 35 U.S.C. 154(b) by 0 days.

(21) Appl. No.: 10/156,081

(22) Filed: May 29, 2002

(65) Prior Publication Data

US 2002/0181253 A1 Dec. 5, 2002

(30) Foreign Application Priority Data

May 30, 2001 (JP) ........................................ 2001-163506

(51) Int. Cl.[7] ................................................. H02J 1/00
(52) U.S. Cl. ........................................................ 307/31
(58) Field of Search ............................. 307/31, 32, 33, 307/34, 35, 39, 11

(56) References Cited

U.S. PATENT DOCUMENTS 5,336,985 A * 8/1994 McKenzie ................. 323/266
6,538,342 B1 * 3/2003 Tsai ............................ 307/34

FOREIGN PATENT DOCUMENTS

JP 2927734 5/1999

OTHER PUBLICATIONS

Toshiyuki Zaitsu et al., "DC–DC Converter with High Efficiency", NEC Technical Report, vol. 51, No. 4 (1998), pp. 86–91. No month.

* cited by examiner

Primary Examiner—Shawn Riley
(74) Attorney, Agent, or Firm—McGinn & Gibb, PLLC

(57) ABSTRACT

A multi-output switching power supply circuit easily produces multiple outputs with increased power source conversion efficiency. The circuit includes, in place of the rectifying diode and the commutating diode used in the multi-output switching power supply circuit of the prior art, a circuit configuration in which an NMOS for synchronous rectification is combined with a constant-voltage control by a magnetic amplifier. It is not required to use, for example, a radiator to dissipate heat, and hence the system size is reduced and the conversion efficiency is increased, and the system can be easily implemented in a low-voltage multi-output configuration. In a configuration in which a magnetic amplifier is arranged between a secondary winding and an first NMOS for synchronous rectification and a drive circuit for the first NMOS and an second NMOS for synchronous rectification is implemented as a separate winding other than the secondary winding, the first NMOS is not included in a loop to flow a reset current. The magnetic amplifier can conduct constant-voltage control without any influence from the interruption of the control loop when the first NMOS on the rectifying side is turned off.

12 Claims, 13 Drawing Sheets

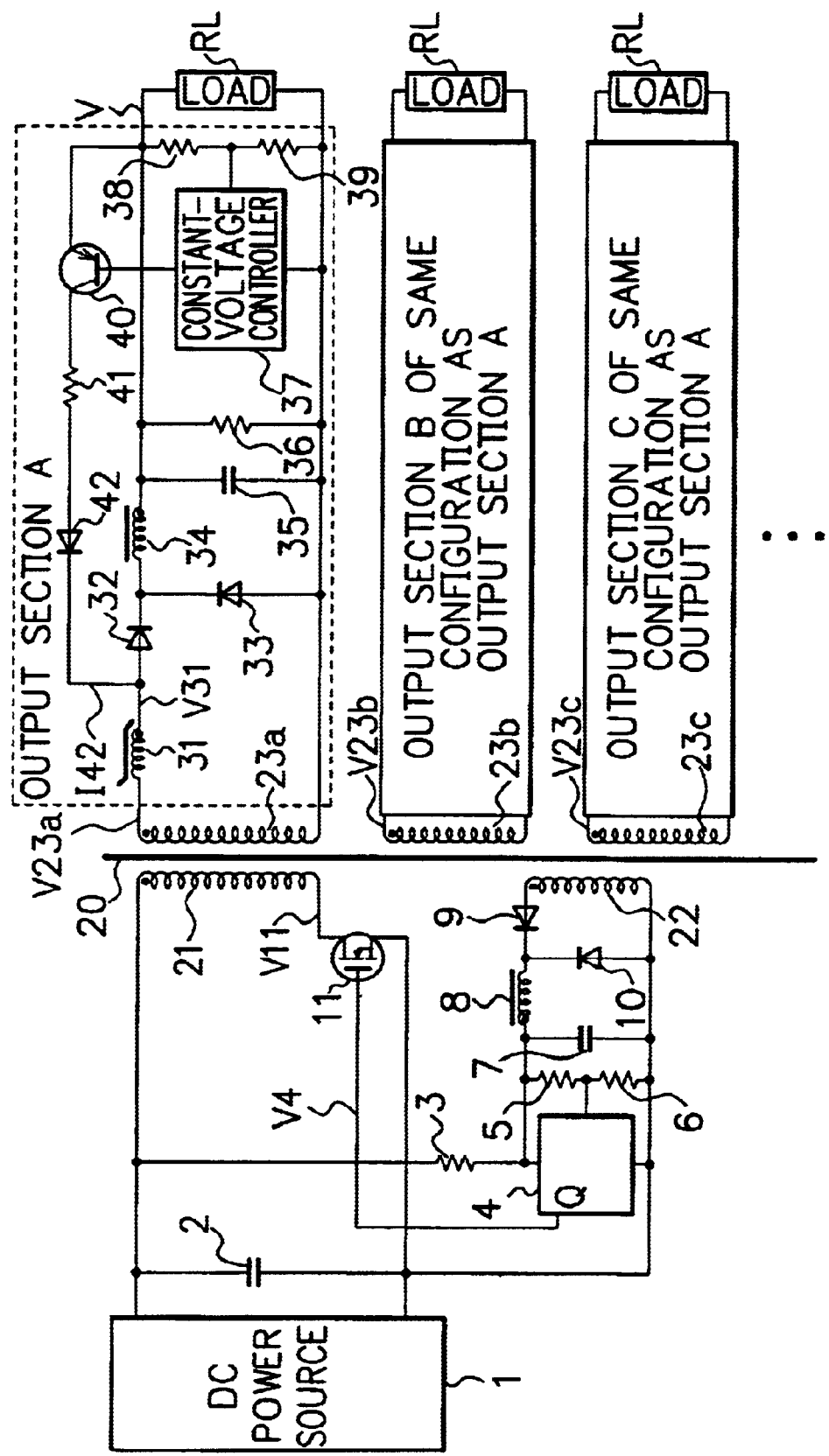
F I G. 1

F I G. 7
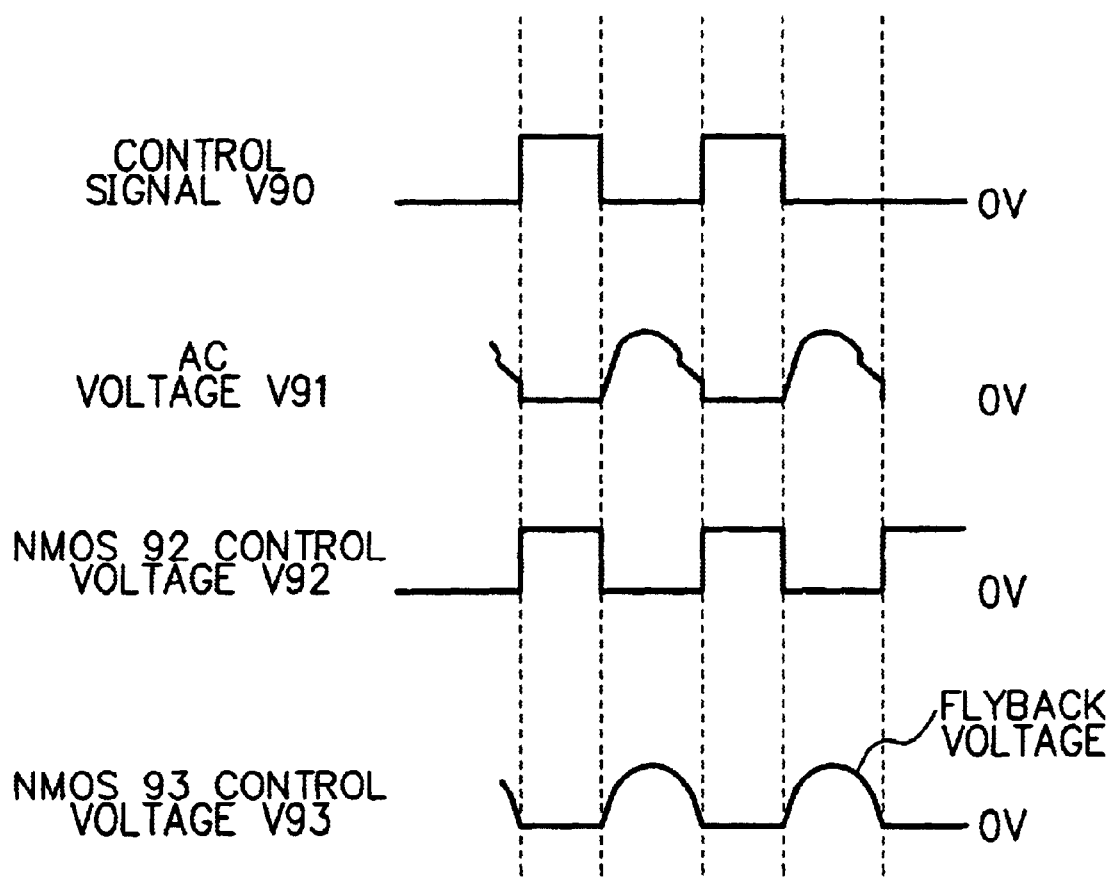

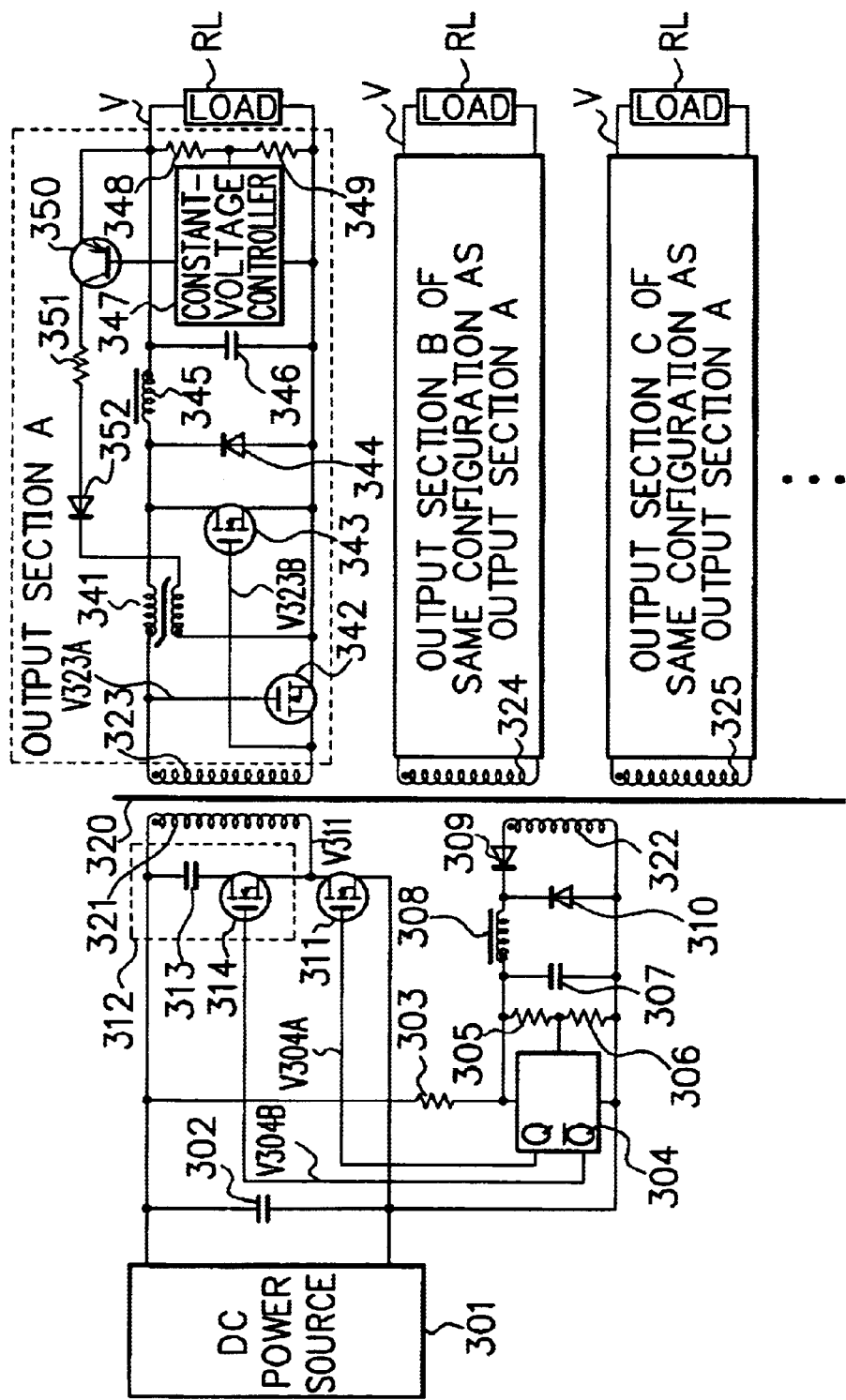
F I G. 14

MULTI-OUTPUT SWITCHING POWER SOURCE CIRCUIT

BACKGROUND OF THE INVENTION

The present invention relates to a multi-output switching power source circuit to conduct constant-voltage control using a magnetic amplifier or a magamp.

Description of the Prior Art

FIG. 1 shows a conventional circuit configuration of a multi-output switching power supply circuit to conduct constant-voltage control using a magnetic amplifier or a transducer.

The power supply 20 includes a transformer 20 including a primary side which includes a direct-current (dc) power source 1, an input smoothing condenser or capacitor 2, a starting resistor 3, a pulse width modulation controller 4, detecting resistors 5 and 6, a capacitor 7, a smoothing choke coil 8, a rectifying diode 9, a commutating diode 10, and a main switch 11, e.g., an n-type metal-oxide semiconductor transistor (to be simply referred to as an NMOS hereinbelow).

On the primary side of the transformer 20, a primary winding 21 and an auxiliary winding 22 are disposed. The transformer 20 includes a secondary side including secondary windings 23a, 23b, 23c, etc. for respective output sections A, B, C, etc., respectively.

The output section A includes a magnetic amplifier 31, a rectifier diode 32, a commutator diode 33, a smoothing choke coil 34, a capacitor 35, a dummy resistor 36, a constant-voltage control circuit 37, detecting resistors 38 and 39, a transistor 40, a resistor 41, and a diode 42. The other output sections B, C, and the like are configured substantially in the same manner as for the output section A. Each section includes a load RL in its output section.

Referring next to FIGS. 2 and 3, description will be given of a principle of operation of the magnetic amplifier shown in FIG. 1.

As can be seen from a graph of FIG. 2, the magnetic amplifier 31 is on when a pulse current having a pulse width of x µs (micro sec.) is flowing in the circuit. Even when the pulse current repeatedly changes its state between an on state and an off state, the magnetic amplifier 31 is in a magnetized state which conducts reciprocation between point A corresponding to a maximum value of the pulse current and point B corresponding to a state in which the current or a magnetic field associated therewith is zero as shown in FIG. 2. The magnetic amplifier 31 is kept retained in the on state. However, when a current slightly flows through the amplifier 31 in a direction opposite to that of the pulse current, that is, when a reset current flows therethrough, the state of magnetization of the amplifier 31 changes to a state corresponding to point C. The amplifier 31 therefore turns off. In this situation, even when voltage E is applied to the amplifier 31 in a forward direction, the current does not flows at once. According to a relationship Magnetic flux ($\phi$)=Product of Voltage and Time ($T \times E$), the current starts flowing with a delay of time, i.e., rising time of $$\Delta T = \Delta \phi / E.$$

By controlling the rising time delay $\Delta T$ by the reset current, the pulse width modulation is carried out. In this case, if $$x = \Delta T,$$

no current flows at all. In other words, by regulating the width of $\Delta \phi$ of the amplifier 31, the pulse modulation is conducted in a range of pulse current from 0% to 100%.

Subsequently, description will be given of operation of a multi-output switching power source circuit of the prior art shown in FIG. 1.

In the power supply circuit, the dc power source section 1 generates a dc input voltage V1. The input smoothing capacitor 2 smoothes the voltage V1.

The PWM (power width modulation) control circuit 4 produces a control signal V4 having a predetermined frequency and a pulse width corresponding to detected voltage, which is detected as below. The auxiliary winding 22 on the primary side of the transformer 20 generates an alternating-current (ac) voltage. The rectifying diode 9 rectifies the ac voltage into a pulsating voltage. The smoothing choke coil 8 and the smoothing capacitor 7 smooth the pulsating voltage to obtain an output dc voltage. The resistors 5 and 6 divides the dc voltage. The PWM control circuit 4 detects a change in the divided voltage to thereby produce the detected voltage. The secondary winding 23a produces an ac voltage determined by a turn ratio, i.e., a ratio between a number of turns of the primary winding 21 and that of the secondary winding 23a. By producing an ac voltage proportional to the ac voltage in the secondary winding 23a by the auxiliary winding 22, the PWM control circuit 4 controls the pulse width according to the change in the ac voltage to resultantly keep the output voltage at a fixed value. The NMOS 11 turns on or off the input dc voltage V1 according to the control signal V4 to generate an ac voltage V11 having a predetermined frequency and a pulse width associated with the detected voltage. The transformer 20 transforms the ac voltage V11 to produce ac voltages V23a, V23b, V23c, etc. respectively from the secondary windings 23a, 23b, 23c, etc. according to turn ratios respectively between the primary and secondary windings.

The magnetic amplifier 31 converts the ac voltage V23a through on/off control using a reset current into an ac voltage V31 having a pulse width associated with the reset current. The rectifier diode 32 rectifies the ac voltage V31 to produce a pulsating voltage V32. The voltage V32 has electromagnetic energy of, which is accumulated in the smoothing choke coil 34. When the diode 32 on the rectifying side is off and the diode 33 on the commutating side is on, the electromagnetic energy is supplied to the smoothing capacitor 35. The capacitor 35 smoothes the pulsating voltage V32 into an output do voltage. The output section A feeds the do voltage V to the load RL.

The magnetic amplifier 31 stabilizes the dc voltage using a hysteresis characteristic. That is, the resistors 38 and 39 detects variation in the dc output voltage. The constant-voltage control circuit 37 adjusts the reset current 142 for the magnetic amplifier 31 to stabilize the dc voltage. During a period in which the amplifier 31 is off, the adjusted reset current 142 is delivered via the transistor 40, the resistor 41, and the diode 42 to the amplifier 31. This resultantly controls the rising edge of a period in which the amplifier 31 is on to thereby stabilize the de output voltage.

Referring next to FIG. 4, description will be given of a circuit configuration of a second example of the multi-output switching power supply circuit of the prior art using a magnetic amplifier to control a constant voltage.

The multi-output switching power source circuit includes a main output section A and a plurality of subsidiary output sections B, C, etc. Among the output sections, the main output section A has a maximum output and small load variation. A switching duty ratio on the primary side is controlled by a negative feedback operation according to variation in an output voltage from the main section A. Each of the subsidiary output sections produces an output voltage. For the output voltage, the magnetic amplifier controls and produces an ac voltage having a duty ratio determined according to the output voltage from the main output section A.

The multi-output switching power supply circuit of the conventional example 2 shown in FIG. 4 includes, on the primary side of a voltage transformer 60, a dc power source 51, an input smoothing capacitor 52, a starting resistor 53, a PWM control circuit 54, a capacitor 55, a smoothing choke coil 56, a rectifying diode 57, a commutating diode 58, and an NMOS 59.

The transformer 60 includes a primary winding 61 and a subordinate winding 62 on the primary side and secondary windings 63, 64, 65, etc. on its secondary side.

The main output section A includes a rectifying diode 71, a commutating diode 72, a smoothing choke coil 73, a smoothing capacitor 74, a dummy resistor 75, and a constant-voltage control circuit 76. The main output section A is connected to a load RL1. The subordinate section B includes a magnetic amplifier 79, a rectifying diode 80, a commutating diode 81, a smoothing choke coil 82, a smoothing capacitor 83, a constant-voltage control circuit 84, resistors 85 and 86, a transistor 87, a resistor 88, and a diode 89. The subordinate output section B is connected to a load RL2. The subordinate output section C is configured substantially in the same way as for the subordinate output section C and is connected to a load RL3.

The secondary winding 63 of the transformer 60 produces an ac voltage. The rectifying diode 71 rectifies the ac voltage into a pulsating voltage V71 having electro-magnetic energy. The smoothing choke coil 73 accumulates the electro-magnetic energy. When the rectifying diode 71 is off and the commutating diode 72 is on, the electro-magnetic energy is fed to the smoothing capacitor 74. The capacitor 74 smoothes the pulsating voltage V71 into a dc output voltage V1 to be applied to the dummy resistor 75 and the load RL1. When the output voltage V1 changes, the constant-voltage control circuit 76 detects the voltage change to produce a detection signal V76. The signal V76 is supplied to the PWM controller 54, which conducts negative feedback control for a pulse width of an ac voltage V59.

According to a duty ratio determined by the PWM controller 54, the secondary winding 64 of the transformer 60 generates an ac voltage V64 corresponding to a turn ratio between the primary winding 61 and the secondary winding 64. The ac voltage V64 is fed via a magnetic amplifier 79 of the subordinate output section B to be rectified by a diode 80 into a pulsating voltage V80. The voltage V80 has electro-magnetic energy, which is accumulated in the smoothing choke coil 82. When the rectifying diode 80 is off and the commutating diode 81 is on, the electro-magnetic energy is supplied to the smoothing capacitor 83. The smoothing capacitor 83 smoothes the pulsating voltage V80 into a dc output voltage V2. The subordinate output section B feeds the dc output voltage V2 to the load RL2. The resistors 85 and 86 detects variation in the voltage V2, and the constant-voltage controller 84 accordingly adjusts a reset current 189 for the magnetic amplifier 79 to stabilize the dc output voltage V2. When the NMOS 59 is off, that is, when the rectifying diode 80 is off, the reset current is delivered via the transistor 87, the resistor 88, and the diode 89 to the magnetic amplifier 79. As a result, the rising time of the on period of the magnetic amplifier 79 is controlled to stabilize the dc output voltage V2. The subordinate output section C operates in almost the same way as the subordinate output section B.

The Japanese Patent No. 2927734 describes a low-loss output circuit, which is conventional example 3 associated with the technical field of the present invention. As shown in FIG. 5, the prior art is a low-loss output circuit including a magnetic amplifier MA connected to a secondary winding N2 of a voltage transformer producing an ac voltage having a rectangular waveform, a rectifying element Q1 including an MOS field-effect transistor (FET) on a rectifying side, a rectifying element Q2 including an MOS-FET on a flywheel side, and a smoothing choke coil CH and a smoothing capacitor C which smooth outputs from the rectifying elements to produce a dc output voltage. The smoothing choke coil CH supplies a signal to drive the rectifier element Q2.

In the configuration, the smoothing choke coil CH to smooth the output from the rectifier element including an MOS-FET delivers a driving signal to the rectifying element Q2 on the flywheel side to turn the MOS-FET Q2 on. Therefore, the driving signal is fed to the MOS-FET on the smoothing choke coil side to turn the MOS-FET on during a period from when polarity of the secondary winding of the transformer is changed to when the magnetic amplifier is saturated after a lapse of its predetermined controlled period of time. According to the Japanese Patent Ser. No. 2927734, this resultantly reduces power loss on the flywheel side and hence efficiently lowers the overall loss.

In the multi-output switching power supply circuit in which constant voltage control is conducted using a magnetic amplifier as above, a diode is generally employed in its rectifying circuit. The use of such a diode in the rectifier circuit leads to a problem that power loss due to a voltage drop in the diode lowers conversion or transformation efficiency.

There also arises a problem as below. Since circuits of large-scale integration are operated with a lower voltage as a power source voltage thereof, there are highly required output voltages of +3.3 V, +2.5 V, +1.8V, etc. However, the voltage drop of the diode is almost fixed, about, 0.4 V. This consequently results in a problem. That is, when the output voltage of the power supply circuit is reduced, the power loss in the rectifier circuit including such a diode becomes relatively larger in the overall loss in the power source circuit. This further lowers the conversion loss and hinders the lowering of the output voltage.

The problem of the multi-output switching power source of the prior art will now be described by referring to the configuration of the conventional example 2 shown in FIG. 4.

Assume that the power source circuit of the prior art does not include the dummy resistor 75. In this situation, when the load RL1 connected to the main output section A is reduced, for example, as in a no-load state and hence a load current thereof becomes equal to or less than a critical current of the smoothing choke coil 73, energy accumulated in the choke coil 73 is stored in the smoothing capacitor 74 to resultantly increase the dc output voltage V1. To suppress the increase in the output voltage V1, a control operation is conducted to reduce a time width of the on state of the main switch (NMOS) 59. In this situation, the pulse width of the ac voltage generated by the secondary winding 63 becomes smaller depending on cases. Therefore, it is impossible to guarantee the period of time or the voltage-time product necessary for the magnetic amplifier 79 in the subordinate output section B (between the voltage applied across the magnetic amplifier 79 and the time required for the saturation of the magnetic amplifier 79). To cope with the difficulty, a dummy resistor 75 is arranged in the main output section A. The resistor 75 keeps the time width of the on state of the main switch (NMOS) 59 to thereby guarantee the voltage-time product necessary for the magnetic amplifier 79. This leads to a problem that the dummy resistor continuously requires power and hence the power efficiency is lowered. This leads to an additional problem. That is, for the dummy resistor 75, a radiator is required to cool the dummy resistor 75 or an electronic dummy circuit is required, and hence the number of constituent components is increased.

Moreover, the low-loss output circuit of the conventional example 3 achieving constant voltage control by a magnetic amplifier and including a synchronous rectifying element using an MOS-FET has an object in which the smoothing choke coil supplies a driving signal to the rectifier element on the flywheel side to prevent a state in which the MOS-FETs Q1 and Q2 are on at the same time to thereby suppress occurrence of a short-circuit current. The invention is therefore not associated with output voltage control in the technical field of the present invention.

In addition, no consideration has been given to influence of failure on the primary side of the voltage transformer upon the secondary side thereof in the conventional example 3. For example, in the circuit configuration of FIG. 6, the voltage transformer includes a core which is reset by a free resonance caused by inductance of the transformer and drain-source capacitance of an NMOS 91 including a gate electrode. As a result, the gate electrode of the NMOS 93 is applied with a flyback voltage as shown in FIG. 7, and hence its conductive state is deteriorated.

SUMMARY OF THE INVENTION

It is therefore an object of the present invention, which has been devised to solve the problems, to provide a multi-output switching power supply circuit which can increase power source conversion efficiency to easily increase the number of outputs.

Another object of the present invention is to provide a multi-output switching power supply circuit including a main output section and subordinate output sections in which the subordinate output section can produce dc output voltages in a stable state without employing a dummy resistor and an electronic dummy resistor in the main output section.

In accordance with a first aspect of the present invention, there is provided a multi-output switching power supply circuit, comprising a dc power source for generating a dc input voltage; a detecting circuit for detecting a voltage value of a second ac voltage generated by a first subordinate winding, the first subordinate winding constituting a voltage transformer including a primary side, a primary winding, a core, a secondary side, and a secondary winding; a switching circuit for turning on or off the dc input voltage according to a control signal generated by detecting variation in the voltage value of the second ac voltage and thereby producing a first ac voltage having a predetermined frequency and a pulse width corresponding to the second ac voltage; a control circuit for generating the control signal according to variation in the voltage value of the second ac voltage detected by said detecting circuit; an active clamp circuit for passing an exciting current through the primary winding of said voltage transformer during an off period of said switching circuit and for thereby resetting the core of said voltage transformer, said dc power source, said detecting circuit, said switching circuit, said control circuit, and said active clamp circuit being arranged on the primary side of said voltage transformer; and a plurality of output sections disposed on the secondary side of said voltage transformer, each of said output sections comprising a magnetic amplifier for controlling, according to a reset current, on or off of a third ac voltage generated on the secondary winding through voltage conversion of the first ac voltage by said voltage transformer and for thereby generating a fourth ac voltage having a pulse width corresponding to the reset current; a rectifying circuit for rectifying the fourth ac voltage into a pulsating voltage; a smoothing circuit for smoothing the pulsating voltage into a dc output voltage and for applying the dc output voltage to a load; and a voltage control circuit for detecting variation in the dc output voltage and for generating the reset current to conduct negative feedback control for the fourth ac voltage. Moreover, said rectifying circuit comprises a first NMOS transistor which is turned on or off according to a voltage value of a fifth ac voltage generated on a second subordinate winding disposed on the secondary side of said voltage transformer and which thereby generates the pulsating voltage; said smoothing circuit comprises a smoothing capacitor for smoothing the pulsating voltage into the dc output voltage and for applying the dc output voltage to a load; a choke coil for accumulating electromagnetic energy associated with the pulsating voltage; and a second NMOS transistor which turns on, when said first NMOS transistor is off, according to a voltage value of a sixth ac voltage generated on a third subordinate winding disposed on the secondary side of said voltage transformer and which thereby supplies the electromagnetic energy from the choke coil to the smoothing capacitor; and said magnetic amplifier is arranged between the secondary winding and said first NMOS transistor.

In accordance with a second aspect of the present invention, there is provided a multi-output switching power supply circuit, comprising a dc power source for generating a dc input voltage; a detecting circuit for detecting a voltage value of a second ac voltage generated by a first subordinate winding, the first subordinate winding constituting a voltage transformer including a primary side, a primary winding, a core, a secondary side, and a secondary winding; a switching circuit for turning on or off the dc input voltage according to a control signal generated by detecting variation in the voltage value of the second ac voltage and thereby producing a first ac voltage having a predetermined frequency and a pulse width corresponding to the second ac voltage; a control circuit for generating the control signal according to variation in the voltage value of the second ac voltage detected by said detecting circuit and a level of a detection signal detected by a voltage variation detecting circuit; an active clamp circuit for passing an exciting current through the primary winding of said voltage transformer during an off period of said switching circuit and for thereby resetting the core of said voltage transformer, said dc power source, said detecting circuit, said switching circuit, said control circuit, and said active clamp circuit being arranged on the primary side of said voltage transformer; a main output section disposed on the secondary side of said voltage transformer, comprising a first rectifying circuit for rectifying a seventh ac voltage generated on a first secondary winding through voltage conversion of the first ac voltage by said voltage transformer and for thereby generating a first pulsating voltage; a first smoothing circuit for smoothing the first pulsating voltage into a first dc output voltage and for applying the first dc output voltage to a load; and the voltage variation detecting circuit for detecting variation in the first dc output voltage into a detection signal and for supplying the detection signal to said control circuit; and a plurality of output sections disposed on the secondary side of said voltage transformer, each of said output sections comprising a magnetic amplifier for controlling, according to a reset current, on or off of an eighth ac voltage generated on the secondary winding through voltage conversion of the first ac voltage by said voltage transformer and for thereby generating a ninth ac voltage having a pulse width corresponding to the reset current; a second rectifying circuit for rectifying the ninth ac voltage into a second pulsating voltage; a second smoothing circuit for smoothing the second pulsating voltage into a second dc output voltage and for applying the second dc output voltage to a load; and a voltage control circuit for detecting variation in the second dc output voltage and for generating the reset current to conduct negative feedback control for the ninth ac voltage. Said first rectifying circuit comprises a first NMOS transistor which turns the seventh ac voltage on or off at timing synchronized with switching timing of said switching circuit and which thereby generates the first pulsating voltage; said smoothing circuit comprises a first smoothing capacitor for smoothing the first pulsating voltage into the first dc output voltage and for applying the first dc output voltage to a load; a first choke coil for accumulating electromagnetic energy associated with the first pulsating voltage; and a second NMOS transistor which turns on when said first NMOS transistor is off, and which thereby supplies the electro-magnetic energy from the choke coil to the smoothing capacitor; said second rectifying circuit comprises a third NMOS transistor which is turned on or off according to a voltage value of a tenth ac voltage generated on the second subordinate winding disposed on the secondary side of said voltage transformer; said second smoothing circuit comprises a second smoothing capacitor for smoothing the second pulsating voltage into the second dc output voltage and for applying the second dc output voltage to a load; a second choke coil for accumulating electromagnetic energy associated with the second pulsating voltage; and a fourth NMOS transistor which turns on, when said fourth NMOS transistor is off, according to a voltage value of an 11th ac voltage generated on a third subordinate winding disposed on the secondary side of said voltage transformer and which thereby supplies the electromagnetic energy from the second choke coil to the second smoothing capacitor; and said magnetic amplifier is arranged between the secondary winding and said third NMOS transistor.

In accordance with a third aspect of the present invention, there is provided a multi-output switching power supply circuit, comprising a dc power source for generating a dc input voltage; a detecting circuit for detecting a voltage value of a second ac voltage generated by a first subordinate winding, the first subordinate winding constituting a voltage transformer including a primary side, a primary winding, a core, a secondary side, and a secondary winding; a switching circuit for turning on or off the dc input voltage according to a control signal generated by detecting variation in the voltage value of the second ac voltage and thereby producing a first ac voltage having a predetermined frequency and a pulse width corresponding to the second ac voltage; a control circuit for generating the control signal according to variation in the voltage value of the second ac voltage detected by said detecting circuit and a level of a detection signal detected by a voltage variation detecting circuit; an active clamp circuit for passing an exciting current through the primary winding of said voltage transformer during an off period of said switching circuit and for thereby resetting the core of said voltage transformer, said dc power source, said detecting circuit, said switching circuit, said control circuit, and said active clamp circuit being arranged on the primary side of said voltage transformer; and an output section disposed on the secondary side of said voltage transformer, comprising a magnetic amplifier for controlling, according to a reset current, on or off of a third ac voltage generated on the secondary winding through voltage conversion of the first ac voltage by said voltage transformer and for thereby generating a fourth ac voltage having a pulse width corresponding to the reset current; a rectifying circuit for rectifying the fourth ac voltage into a pulsating voltage; a smoothing circuit for smoothing the pulsating voltage into a dc output voltage and for applying the dc output voltage to a load; and a voltage control circuit for detecting variation in the dc output voltage and for generating the reset current to conduct negative feedback control for the fourth ac voltage. Moreover, said rectifying circuit comprises a first NMOS transistor which turns the third ac voltage on or off at timing synchronized with switching timing of said switching circuit and which thereby generates the pulsating voltage; said smoothing circuit comprises a smoothing capacitor for smoothing the pulsating voltage into the dc output voltage and for applying the dc output voltage to a load; a choke coil for accumulating electromagnetic energy associated with the pulsating voltage; and a second NMOS transistor which turns on when said first NMOS transistor is off, and which thereby supplies the electro magnetic energy from the choke coil to the smoothing capacitor; said first NMOS transistor includes a gate electrode, a source electrode, and a drain electrode, said gate electrode being connected to a winding end side of the secondary winding, said source electrode being linked with a ground side, said drain electrode being coupled with a winding start side of the secondary winding; said second NMOS transistor includes a gate electrode, a source electrode, and a drain electrode, said gate electrode being connected to the winding start side of the secondary winding, said source electrode being linked with a ground side, said drain electrode being coupled with an output port of said magnetic amplifier; said magnetic amplifier is arranged between the gate electrode of said first NMOS transistor and the drain electrode of said second NMOS transistor; and the reset current is supplied to a winding start side of said reset winding and is outputted to the ground side.

In accordance with a fourth aspect of the present invention, the multi-output switching power supply circuit of one of the first to third aspects described above further comprises a diode having a small voltage drop in a stage after said second NMOS transistor in parallel with said second NMOS transistor.

In accordance with a fifth aspect of the present invention, in the multi-output switching power supply circuit of one of the first to third aspects described above, said active clamp circuit comprises a capacitor connected to a winding end side of the primary winding of said voltage transformer; and an NMOS transistor including a gate electrode, a source electrode, and a drain electrode, said gate electrode being connected to a signal delivered from said control circuit, said signal being opposite in phase to the control signal generated from said control circuit; said source electrode being coupled with an output from said switching circuit, said drain electrode linked with said capacitor, the signal opposite in phase to the control signal generated from said control circuit having deadtime preventing an event in which said switching circuit and said NMOS are on at the same time.

In accordance with a sixth aspect of the present invention, in the multi-output switching power supply circuit of one of the first to third aspects described above, said third ac voltage has a pulse width necessary for saturation of said magnetic amplifier.

In accordance with a seventh aspect of the present invention, in the multi-output switching power supply circuit of the second aspect described above, said eighth ac voltage has a pulse width necessary for saturation of said magnetic amplifier.

BRIEF DESCRIPTION OF THE DRAWINGS

The objects and features of the present invention will become more apparent from the consideration of the following detailed description taken in conjunction with the accompanying drawings in which:

FIG. 1 is a block diagram showing a configuration of a multi-output switching power source circuit of the prior art;

FIG. 7 is a graph to explain a problem occurring in a multi-output switching power source circuit of the prior art;

FIG. 14 is a block diagram showing a configuration of a third embodiment in accordance with the present invention.

DESCRIPTION OF THE EMBODIMENTS

Referring next to the accompanying drawing, description will be given in detail of embodiments of a multi-output switching power source circuit in accordance with the present invention. FIGS. 8 to 14 show embodiments of the multi-output switching power source circuit in accordance with the present invention.

First Embodiment

Figure 2:
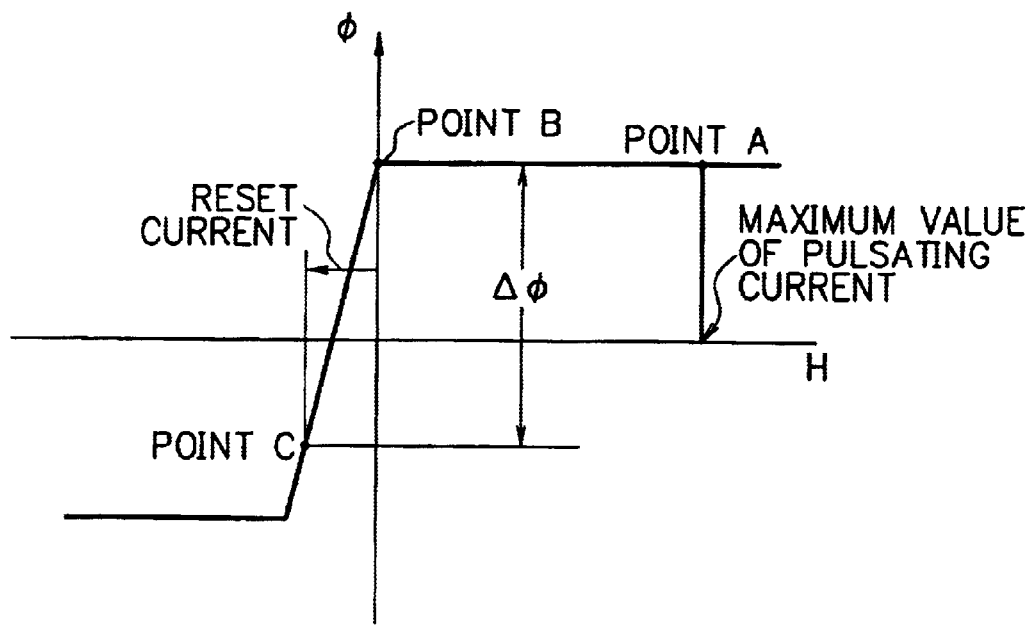
FIG. 2 is a graph to explain a function of a magnetic amplifier.
Figure 3:
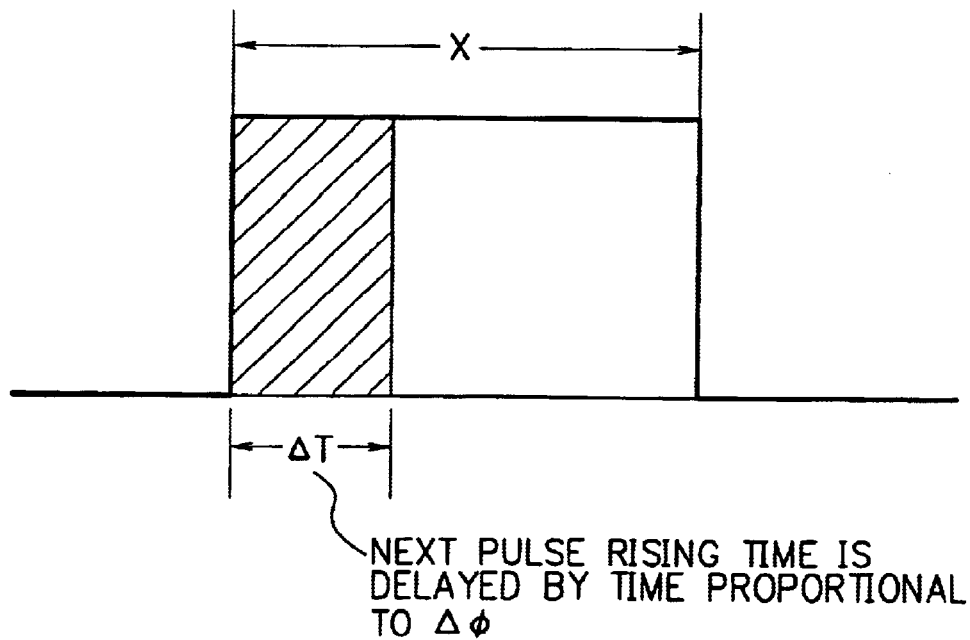
FIG. 3 is a graph to further explain a function of a magnetic amplifier.
Figure 4:
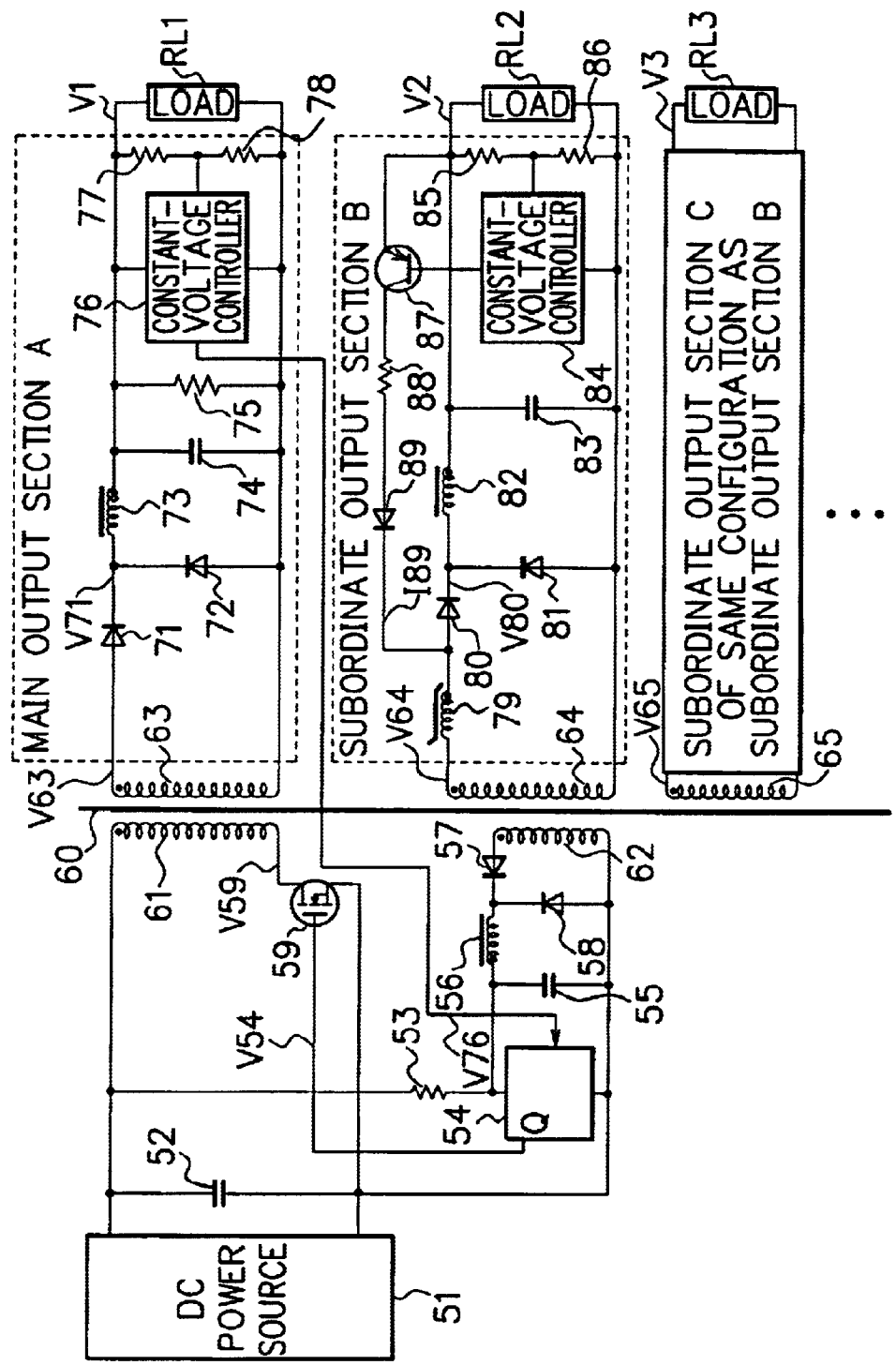
FIG. 4 is a block diagram showing a configuration of a multi-output switching power source circuit of the prior art.
Figure 5:
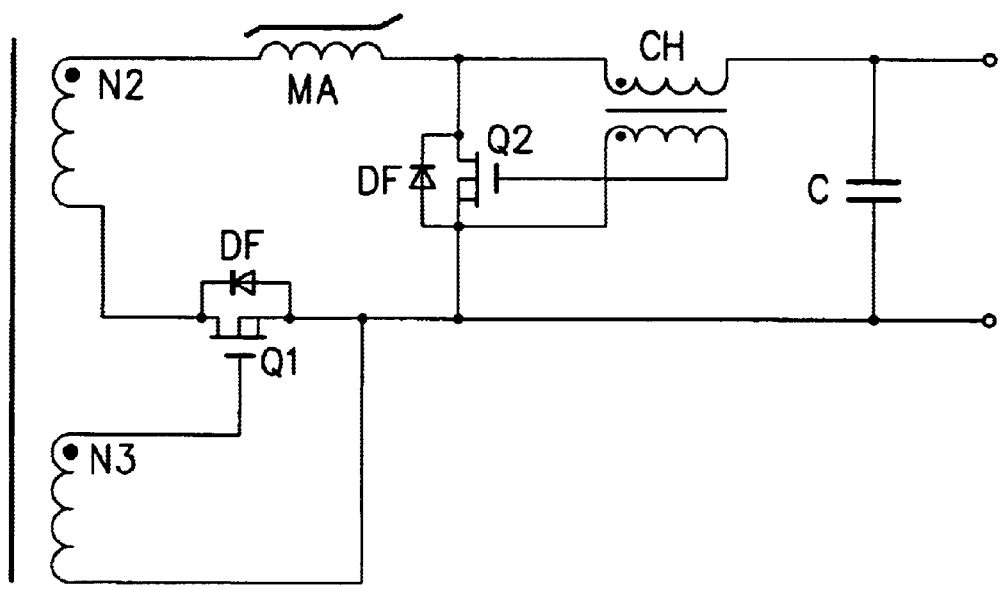
FIG. 5 is a circuit diagram showing a configuration of a multi-output switching power source circuit of the prior art.
Figure 6:
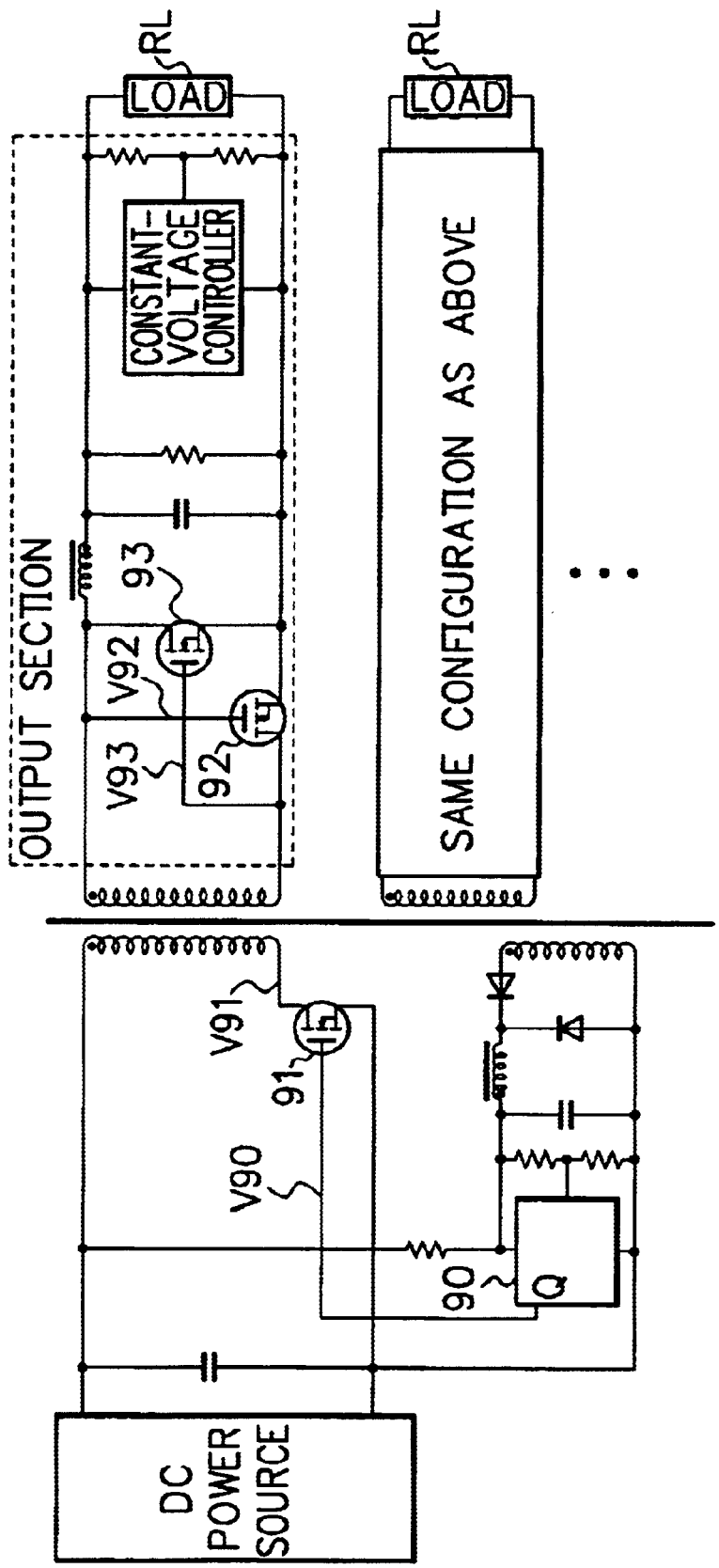
FIG. 6 is a block diagram showing a configuration of a multi-output switching power source circuit of the prior art.
Figure 8:
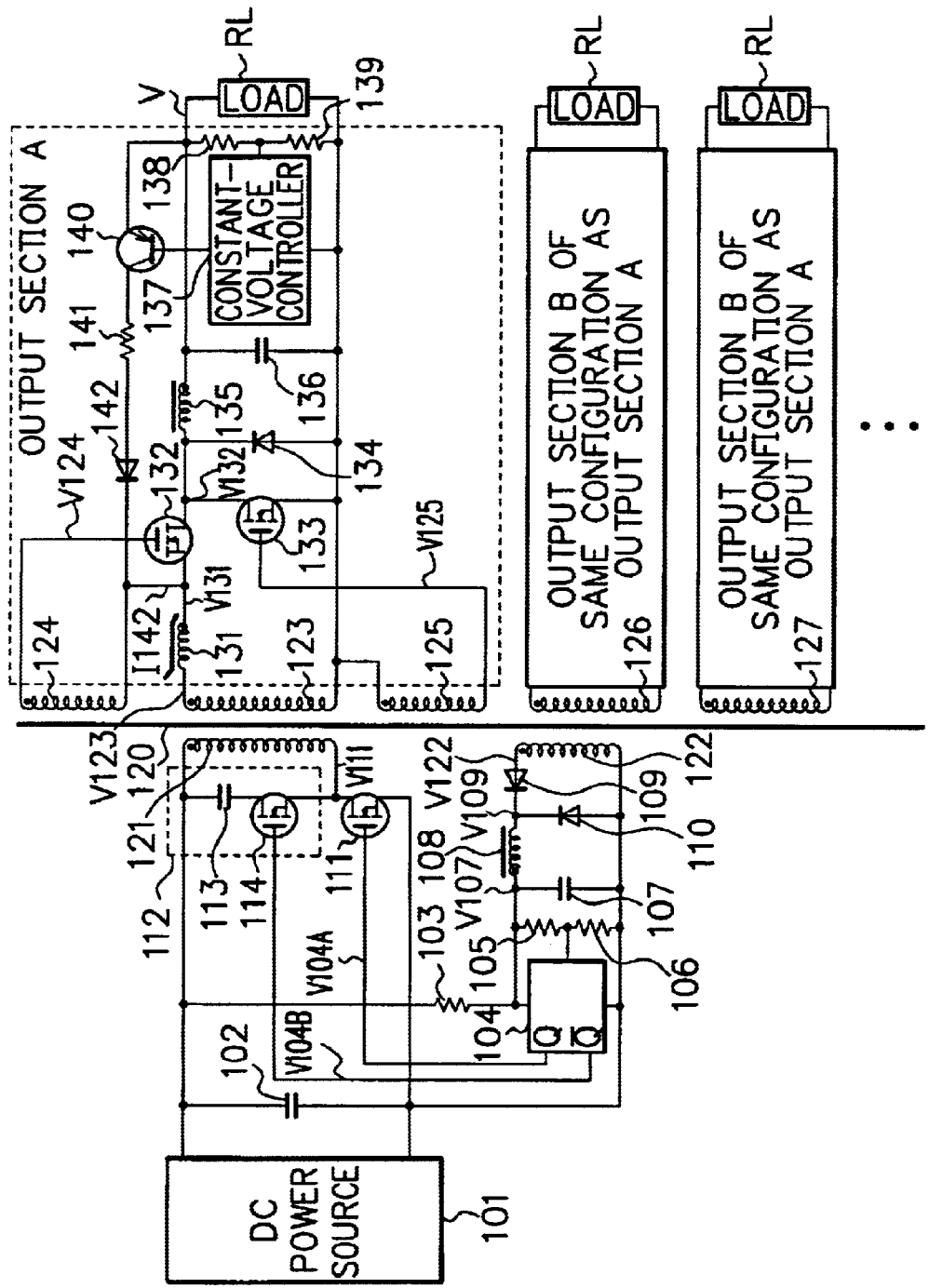
FIG. 8 is a block diagram showing a configuration of a first embodiment in accordance with the present invention.
Figure 9:
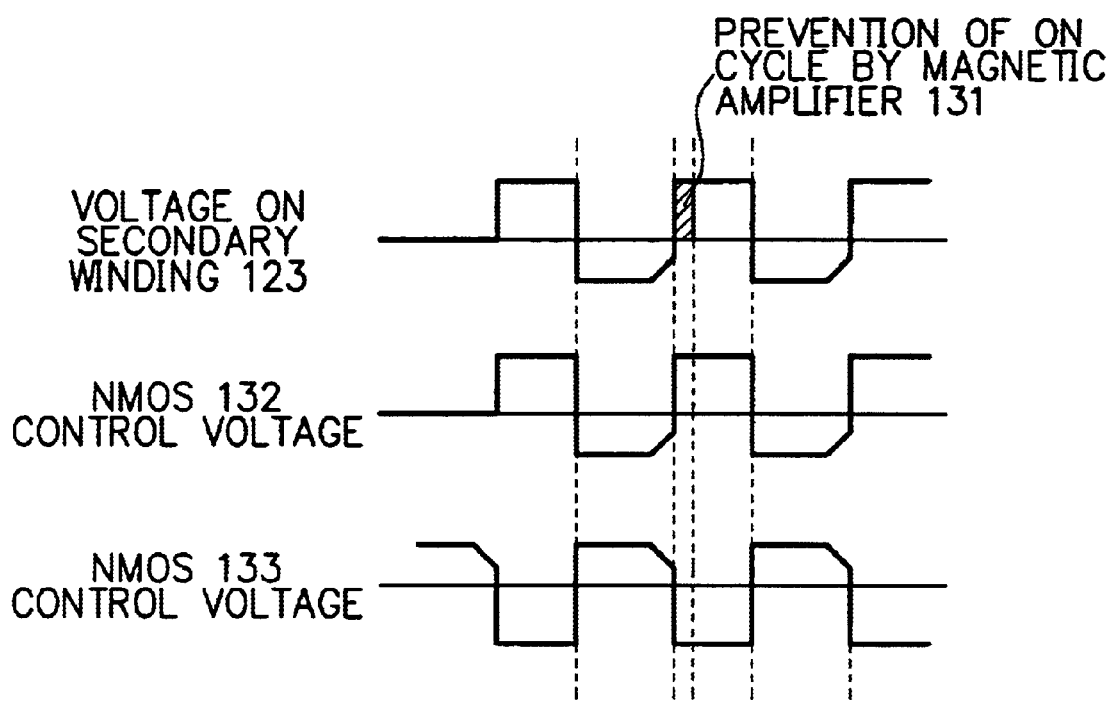
FIG. 9 is a graph to explain a function of an active clamp circuit.

FIG. 8 shows a configuration of electric connections of an embodiment of the a multi-output switching power source circuit in accordance with the present invention. Description will now be given in detail of the embodiment by referring to FIG. 8.

The multi-output switching power circuit in accordance with the present invention is adopted a forward converter type and includes a switching circuit(s) which is produced a predetermined ac voltage in a primary winding and an auxiliary winding 122 by applying an input voltage from a dc power source(s) and on/off controlling by the transistor 111.

The configuration of the power source circuit includes a transformer 120 having a primary side and a secondary side. The circuit includes on the primary side a dc power source 101, an input smoothing capacitor 102, a starting resistor 103, a PWM control circuit 104, detecting resistors 105 and 106, a capacitor 107, a smoothing choke coil 108, a rectifying diode 109, a commutating diode 110, a switching circuit such as an NMOS 111, and an active clamp circuit 112. The circuit 112 includes a capacitor 113 and an NMOS 114.

The dc power supply 101 includes, for example, a battery and produces a dc input voltage V101.

The input smoothing capacitor 102 smoothes the dc input voltage V101.

The starting resistor 103 regulates a start-up current supplied in a PWM control circuit 104 by applying voltage from dc power source 101 on start up. During power up the power source circuit of the present invention, the PWM control circuit 104 is run by the dc voltage V107 which is produced by the auxiliary winding 122 and the dc voltage V107 also becomes a voltage supply source of the PWM control circuit.

The transformer 120 includes a subordinate winding 122 on the primary side to produce an ac voltage V122 associated with a turn ratio between the primary winding 120 and the subordinate winding 122. The diode 109 rectifies the ac voltage V122 into a pulsating voltage V109 having electromagnetic energy. The smoothing choke coil 108 accumulates the electromagnetic energy. When the diode 109 is off and the diode 110 is on, the electromagnetic energy is supplied to the smoothing capacitor 107. The capacitor 107 smoothes the pulsating voltage V109 into a dc voltage V107 to be divided by the resistors 105 and 106. The PWM controller 104 detects variation in the voltage. By controlling the PWM controller 104, the dc voltage V107 is stabilized. The dc voltage V107 set in a voltage supply of the PWM controller 104.

The PWM control circuit 104 generates a control signal V104A having a predetermined frequency and a pulse width corresponding to the detected voltage to conduct negative feedback control for a pulse width of an ac voltage V111, which will be described later. The PWM controller 104 generates, in addition to the control signal V104A to control the NMOS 111, a control signal V104B opposite in phase to the control signal V104A to control the NMOS 114.

According to the control signal V104A from the controller 104, the NMOS 111 turns the dc input voltage V101 on or off to generate the ac voltage V111 having a predetermined frequency and a pulse width corresponding to the detected voltage.

The NMOS 114 turns on when the NMOS 111 is off, a resonance circuit is configured by a primary winding 120 and the capacitor 113 of the voltage transformer 120 to flow an exciting current to the primary winding 121 to reset the core of the transformer 120.

The transformer 120 includes the primary winding 121 and the subordinate winding 122 on the primary side and the secondary winding 123, a subordinate winding 124 to generate a control voltage V124 for on/off control of an NMOS 132 and a subordinate winding 125 to generate a control voltage V125 for on/off control of an NMOS 133 on the secondary side.

The secondary side of the transformer 120 includes a plurality of output sections of which each includes a magnetic amplifier 131, synchronous rectifying FETs 132 and 133, a Schottky barrier diode 134, a smoothing choke coil 135, a smoothing capacitor 136, a constant-voltage controller 137, resistors 138 and 139, a transistor 140, a resistor 141, and a diode 142. Each output section is connected to a load RL.

The magnetic amplifier 131 turns on or off the ac voltage V123 from the secondary winding 123 according to a reset current T142 to produce an ac voltage V131 having a pulse width associated with the reset current I142.

The NMOS 132 includes a gate electrode, a source electrode, and a drain electrode. The gate electrode is connected to a winding end port of the subordinate winding 124, the source electrode is coupled with an output side of the magnetic amplifier 131, and the drain electrode is linked with a drain electrode of the NMOS 133. The NMOS 132 constitutes a synchronous rectifying circuit and turns on or off the ac voltage V131 from the magnetic amplifier 131 in synchronism with a change in polarity of the ac voltage V124 from the subordinate winding 124 to generate a pulsating voltage V132.

The smoothing choke coil 135 accumulates electromagnetic energy of the pulsating voltage V132.

The NMOS 133 includes a gate electrode, a source electrode, and a drain electrode. The gate electrode is connected to a winding start port of the subordinate winding 125, the source electrode is linked with ground, and the drain electrode is coupled with the drain electrode of the NMOS 132. The NMOS 133 is on when the NMOS 132 is off to supply the electromagnetic energy from the choke coil 135 to the smoothing capacitor 136.

The capacitor 136 smoothes the pulsating voltage V132 to generate a dc output voltage V and applies the voltage V to the load RL.

The voltage V is divided by the resistors 138 and 139. The constant-voltage controller 137 detects variation in the voltage.

According to the sensed change in the dc output voltage V, the controller 137 generates a reset current I142 for negative feedback control of the ac voltage V131.

The constant-voltage circuit 137 controls a current flowing through the transistor 140. The reset current I142 is fed from a collector of the transistor 140 via the resistor 141 and the diode 142 to the magnetic amplifier 131. This resultantly achieves the negative feedback control of the ac voltage V131 to stabilize the dc output voltage V.

In the embodiment, a Schottky barrier diode 134 is connected in parallel with the NMOS 133. The configuration will be described by referring to FIG. 9. Using the reset current I142 from the constant-voltage circuit 137, the amplifier 131 controls a reguration of "on" width (a period of on cycle) by hindering occurrence of an ac voltage on the secondary winding 123 of the transformer 120. As can be seen from FIG. 9, the NMOS 132 is on and the NMOS 133 is off during this period of time blocked by magamp 131. As a result during the reguration of "on" width (the period), a load current through the smoothing choke coil 135 flows through a body diode of the NMOS 133 when the NMOS 132 is on. The body diode causes a large voltage drop. Therefore, a Schottky barrier diode 134 causing a small voltage drop is connected in parallel therewith. Thanks to the constitution, during the prevention period of time of the magnetic amplifier 131, the current of the smoothing choke coil 135 is passed therethrough to remarkably improve the conversion efficiency.

Figure 10:
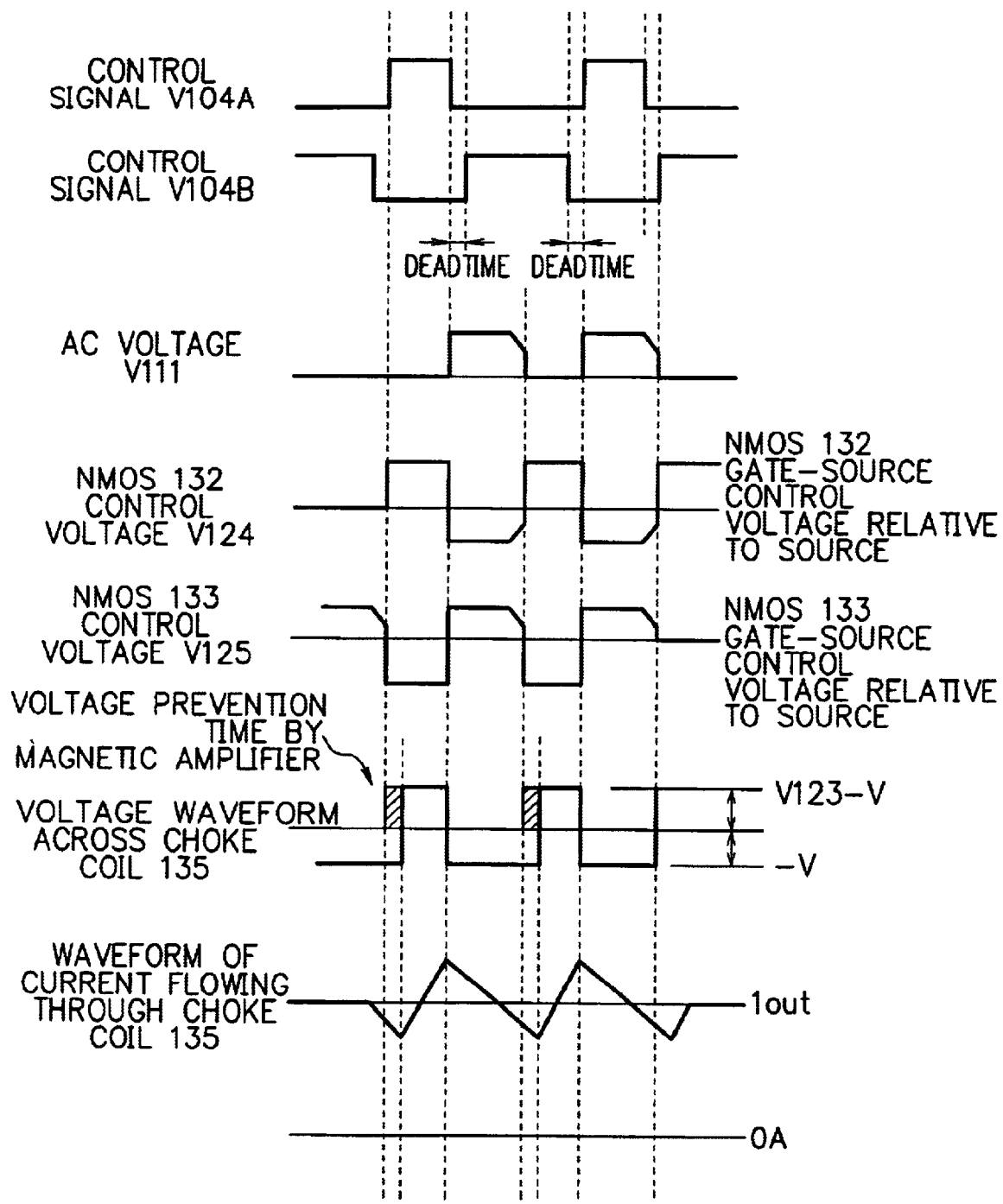
FIG. 10 is a graph showing signal waveforms in the first embodiment.

FIG. 10 shows waveforms in various sections of the embodiment of the multi-output switching power source circuit in a schematic graph in which the abscissa and the ordinate represent voltage and time, respectively.

Referring to the graph of FIG. 10, description will be given of operation of the embodiment of the multi-output switching power source circuit.

The dc power source 101 generates and outputs a dc input voltage V101. The voltage V101 is smoothes by the input smoothing capacitor 102. The PWM controller 104 generates a control signal V104A having a predetermined frequency and a pulse width associated with variation in an ac voltage generated by the subordinate winding 122. The dc input voltage V101 is turned on or off by the NMOS 111 according to the control signal V104A to produce an ac voltage V111 having a predetermined frequency and a pulse width associated with the control signal V104A. The ac voltage V111 is transformed or converted by the voltage transformer 120 to generate ac voltages V123 to V127 on the secondary side of the transformer 120.

Next, description will be given of operation of the active clamp circuit 112 to reset the core of the transformer 120.

The NMOS 111 and the NMOS 114 complementarily turn on and off. However, timing of the control signal V104A from the controller 104 and timing of the control signal V104B from the controller 104 have a deadtime to prevent an event in which the NMOS 111 and the NMOS 114 are set to an on state at the same time. During a period of time in which the NMOS 114 is on, the primary winding 121 and the capacitor 113 of the transformer 120 forms a resonance circuit to flow an exciting current to the primary winding 121 to reset the core of the transformer 120. Therefore, the waveform of the ac voltage V111 becomes similar to a rectangular waveform as shown in FIG. 10 and hence the waveform of the ac voltage V123 becomes similar to the rectangular waveform. As a result, the gate voltage of the NMOS 133 has almost an ideal rectangular waveform, and conduction loss of the NMOS 133 is reduced to increase the conversion efficiency.

The ac voltage V123 appearing on the secondary side is turned on or off by the magnetic amplifier 131 according to the reset current I142 to produce an ac voltage V131 having a pulse width associated with the reset current I142. In this case, since the time width of the on state of the NMOS 111 is not abruptly reduced, the ac voltage V123 on the secondary winding 123 of the transformer 120 has a pulse width necessary for the saturation of the amplifier 131. For the amplifier 131, the voltage-time product is guaranteed (i.e., the product of V×T, where V is the voltage across the amplifier 131 and T is the time for the saturation of the amplifier). The operation will be described later in detail.

The ac voltage V131 from the amplifier 131 is turned on or off by the NMOS 132 at timing synchronized with the change in polarity of the ac voltage V124, namely, the change in the control voltage V124 of the NMOS 132 to resultantly produce a pulsating voltage having electromagnetic energy. The energy is accumulated in the smoothing choke coil 135. The electromagnetic energy is turned on or off by the NMOS 133 in synchronism with the variation in polarity of the ac voltage V125, that is, the variation in the control voltage V125 of the NMOS 133. When the NMOS 132 is off and the NMOS 133 is on, the energy is supplied to the smoothing capacitor 136. The pulsating voltage is smoothed by the smoothing capacitor 136 into a dc output voltage V. The output voltage V is applied to the load RL. The dc voltage V is divided by the resistors 138 and 139. Variation in the voltage is sensed by the constant-voltage controller 137. The controller 137 controls a current of the transistor 140. The reset current I142 is fed from the collector of the transistor 140 via the resistor 141 and the diode 142 to the magnetic amplifier 131 to resultantly conduct negative feedback control for the ac voltage V123. This stabilizes the dc output voltage V.

Description will now be given of the time width of the on state of the NMOS 111 when the load RL becomes small.

When the load current flowing through the smoothing choke coil 135 is equal to or less than a critical current of the choke coil 135, the current flows in both directions when the NMOS 132 is on as shown in FIG. 10. Therefore, the load current also flows in the reverse direction. Excessive energy in the small-load state reversely flows through the choke coil 135 via the transformer 120 to the primary side thereof. As a result, the load current flowing through the coil 135 becomes continuous. In response to variation in the load current, the voltage across the coil 135 varies, as shown in FIG. 10, between [V123−V] and [−V], where V123 is a voltage on the secondary winding 123 of the transformer 120 when the NMOS 111 is on and V is an output voltage from the transformer 120. Therefore, even when the load is small, the dc output voltage is not increased, and hence the time width of the on state of the NMOS 111 is not abruptly reduced.

The embodiment described above includes NMOS in place of diodes used in the prior art for rectification and commutation, and the configuration of the embodiment includes a combination of the NMOS for synchronous rectification and a magnetic amplifier for constant-voltage control. As a result, it is not required to use, for example, a radiator to dissipate heat. Therefore, the system size is reduced and the system efficiency is increased, and the system can be easily implemented in a low-voltage multi-output configuration. Thanks to the removal of the diodes, heat generated in the system is reduced. This increases reliability of the system and contributes to the saving of energy consumed by the system. Since the magnetic amplifier controls the secondary side, it is possible to easily configure a highly stable multi-output power source with reduced interference between the outputs.

In the configuration, the magnetic amplifier 131 is arranged between the secondary winding 123 and the NMOS 132 for synchronous rectification and the driving circuit of the NMOS 132 and 133 for synchronous rectification is implemented using a winding other than the secondary winding 123. Therefore, the NMOS 132 is not included in the loop to flow the reset current. The magnetic amplifier 131 can conduct constant-voltage control without any influence from the interruption of the control loop when the NMOS 132 on the rectifying side is turned off.

By disposing a Schottky barrier diode 134 causing a small voltage drop in parallel with the body diode of the NMOS 133, the current of the smoothing choke coil 135 can be passed through the Schottky barrier diode to increase the conversion efficiency during the period of time in which the amplifier 131 prevents the on cycle.

Additionally, by disposing the active clamp circuit 112 on the primary side of the transformer 120, the flyback voltage has almost a rectangular waveform when the NMOS 111 is off. This guarantees that the NMOS 133 for synchronous rectification on the commutation side is turned on regardless of input and load variations. Utilization efficiency of the transformer can be increased, for example, the transformer can operate in a wide input configuration.

Figure 11:
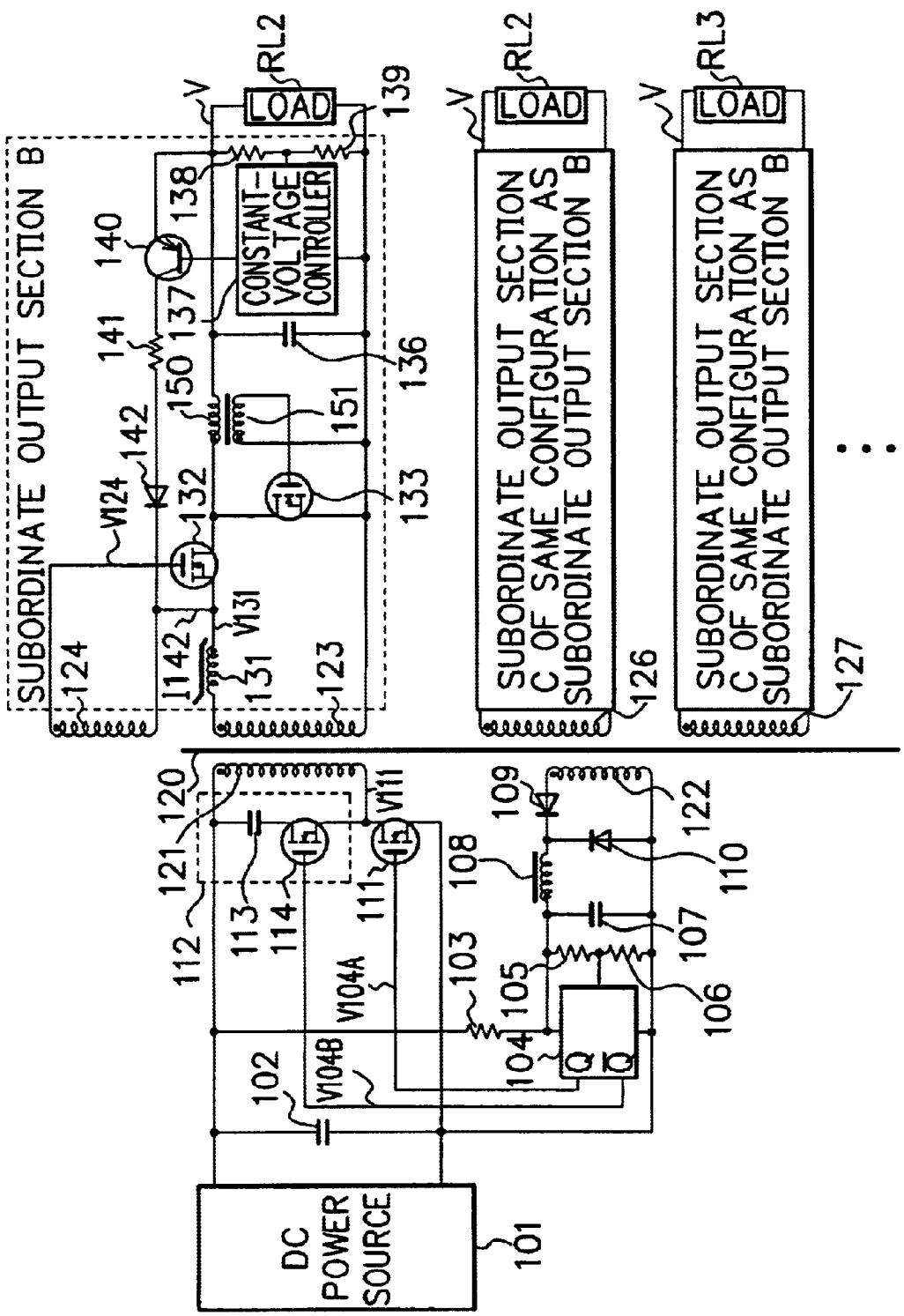
FIG. 11 is a block diagram showing a configuration of a variation of the first embodiment in accordance with the present invention.
Figure 12:
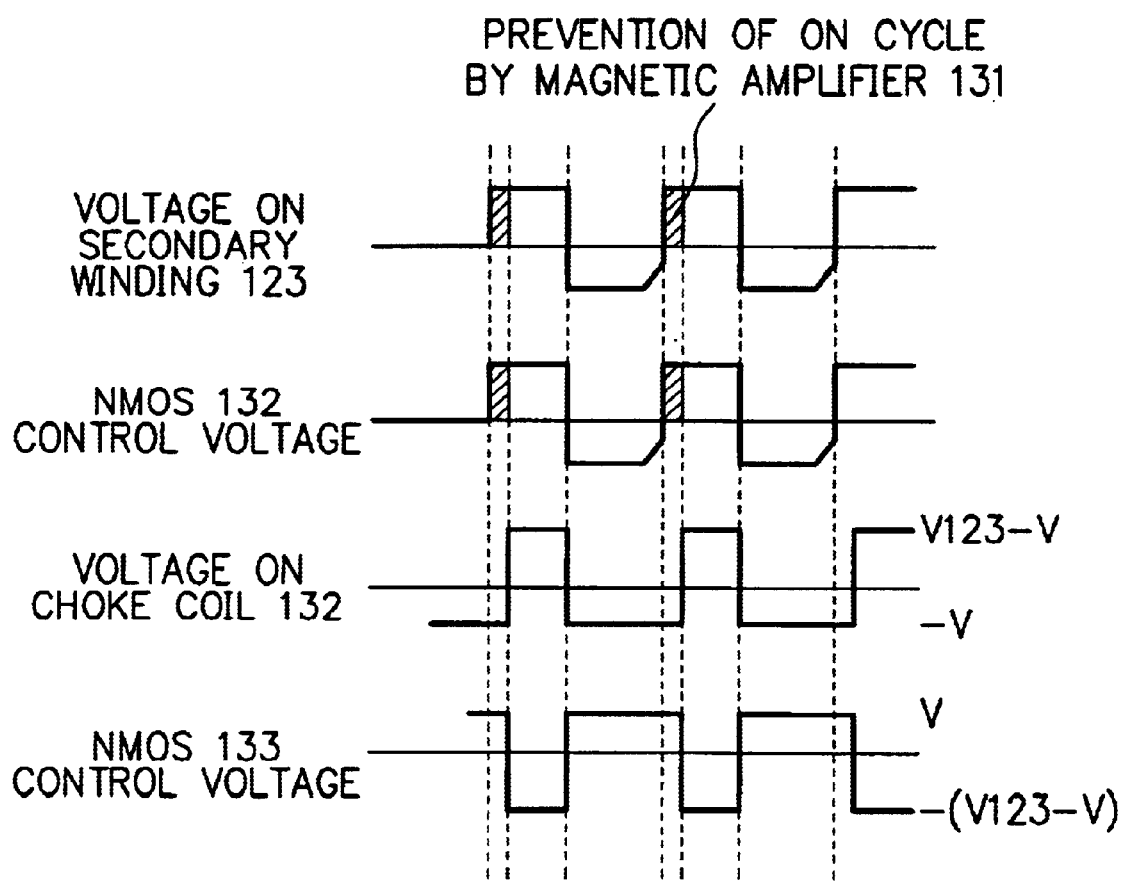
FIG. 12 is a graph showing signal waveforms in the variation of the first embodiment according to the present invention.

The multi-output switching power supply circuit shown in FIG. 11 can be considered as a variation of the embodiment described above. In the variation, the gate voltage to control the NMOS 133 is obtained not from the subordinate winding 125 of the transformer 120. That is, there is provided a coil 150 including a subordinate winding 151, a winding start point of which is connected to the gate electrode of the NMOS 133. Therefore, the gate electrode of the NMOS 133 is applied with an ac voltage opposite in polarity to the voltage applied to the smoothing choke coil 150 as shown in FIG. 12. During the on-cycle prevention period by the amplifier 131, the NMOS 133 is on by the ac voltage generated by the subordinate winding 151 as shown in FIG. 12. The current of the choke coil 150 can be passed through the NMOS 133. Therefore, it is not required to arrange the Schottky barrier diode in parallel with the body diode of the NMOS 133 as in the first embodiment. The voltage V123 of FIG. 12 is generated by the secondary winding 123 of the transformer 120 when the NMOS 111 is on, and V represents an output voltage. The waveforms shown in FIG. 12 are examples when the turn ratio between the choke coil 150 and the subordinate winding 151 is one. By changing the turn ratio therebetween, the voltage applied to the gate electrode of the NMOS 133 can be arbitrarily adjusted.

Second Embodiment

Figure 13:
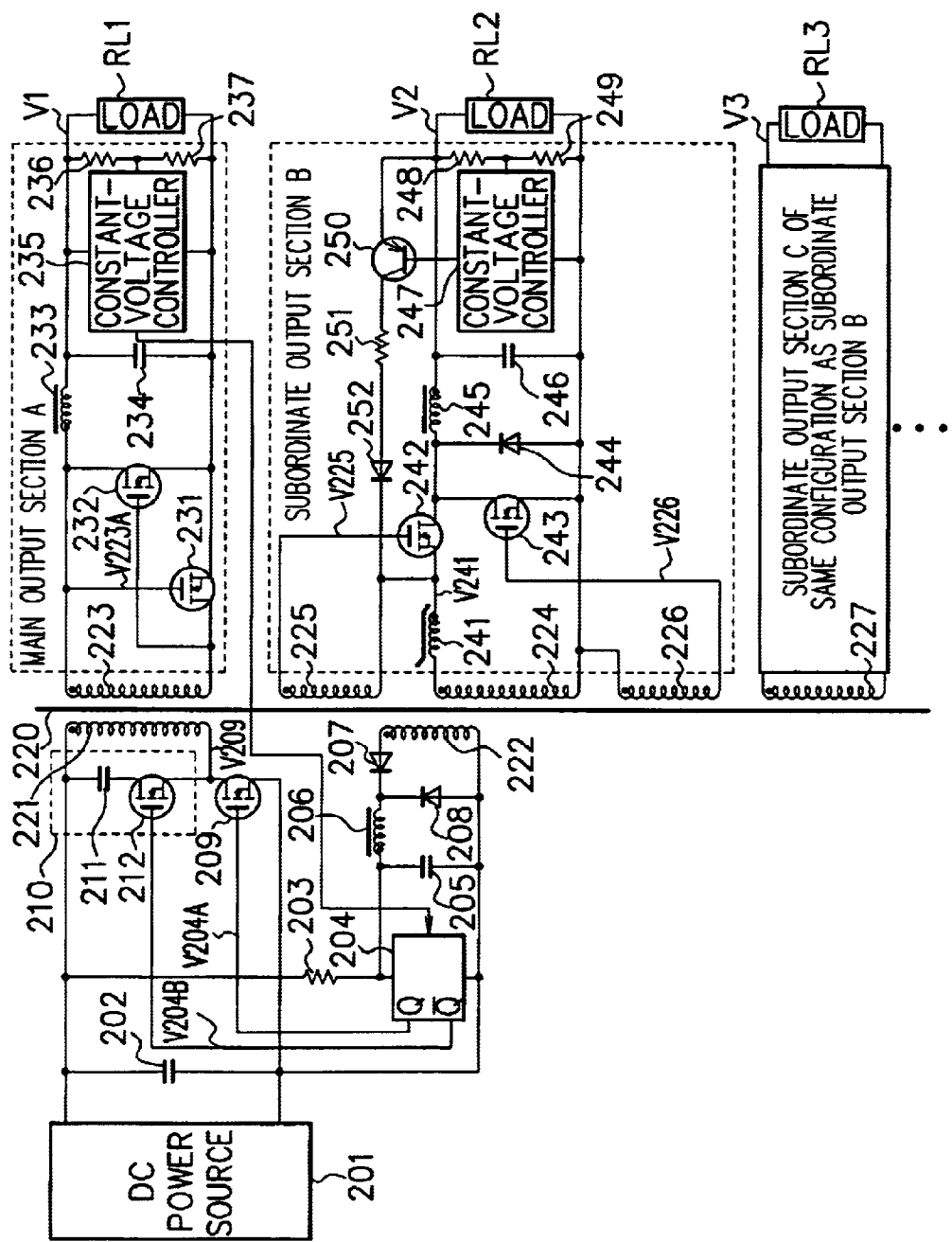
FIG. 13 is a block diagram showing a configuration of a second embodiment in accordance with the present invention.

Next, description will be given of a second embodiment in accordance with the present invention by referring to the accompanying drawings. FIG. 13 shows a circuit configuration of the second embodiment in accordance with the present invention.

The second embodiment is a multi-output switching power source circuit including a main output section and a plurality of subordinate output sections. Among the output sections, the main output section is an output section operates with a maximum output and small load variation. The circuit includes a primary side of which a switching duty ratio is controlled by negative feedback according to variation in an output voltage from the main output section. Output voltages from the subordinate output sections are controlled by feedback of an ac voltage with a duty ratio determined according to an output voltage from the main output section.

The main output section of the second embodiment differs from the associated output section of the first embodiment in that the subordinate winding to drive the NMOS 231 and the NMOS 232 is not arranged, the magnetic amplifier 131 is not used, and the transistor 141, the resistor 142, and the diode 143 to supply the reset current to the amplifier 131 are not disposed.

The NMOS 231 includes a gate electrode connected to a winding end point of the secondary winding 223, a source electrode coupled with a source electrode of the NMOS 232 in the subsequent stage, and a drain electrode linked with a winding start point of the secondary winding 223. The NMOS 232 includes a gate electrode coupled with the winding start point of the secondary winding 223, the source electrode linked with the source electrode of the NMOS 231, and a drain electrode connected to the winding end point of the secondary winding 223.

The NMOS 231 constitutes a synchronous rectifying circuit and turns on or off an ac voltage V223 on the secondary winding according to change in polarity of the ac voltage V223 to produce a pulsating voltage V231 The NMOS 232 turns on when the NMOS 231 is set to off to supply electromagnetic energy from the smoothing choke coil 233 to the smoothing capacitor 234.

The main output section A of the second embodiment does not include the magnetic amplifier and the transistor, the resistor, and the diode to supply the reset current to the amplifier. Therefore, at detection of variation in the dc output voltage VI from the smoothing coil 234, a constant-voltage controller 235 notifies a detection signal indicating the detected voltage change to a PWM controller 204. The controller 204 generates a control signal V204 with a pulse width according to a change of an ac voltage appearing on a subordinate winding 222 in proportion to an associated turn ratio and to the detection signal from the constant-voltage controller 235.

The subordinate output sections are configured almost in the same way as for the output section of the first embodiment and are connected to loads RL2 and RL3, respectively.

The second embodiment configured as above is effectively applicable when there exists a large-current output which cannot be controlled by a magnetic amplifier. The second embodiment can also obtain an advantageous effect similar to that of the first embodiment.

Third Embodiment

Referring now to the accompanying drawings, description will be given of a third embodiment in accordance with the present invention. FIG. 14 shows a configuration of the third embodiment of the present invention.

The third embodiment and the first embodiment are configured basically in the same way. The third embodiment includes a devised configuration of an NMOS synchronous rectifying circuit and a magnetic amplifier control circuit.

In the third embodiment, an NMOS 342 and an NMOS 343 for synchronous rectification are driven by a voltage generated by a secondary winding 323, and a magnetic amplifier is arranged between a gate electrode of the NMOS 342 on a rectification side and a drain electrode of the NMOS 343 on a commutation side. The magnetic amplifier 341 additionally includes a reset winding to reset the core of the amplifier 341. A constant-voltage circuit 347 supplies a reset current to a winding start point of the reset winding to be delivered via the NMOS 342 to a ground side in a subsequent stage. Therefore, the loop to flow the reset current does not include the NMOS 342 for synchronous rectification. The magnetic amplifier can be turned on or off without any influence from the interruption of the control loop when the NMOS 342 is turned off. Therefore, the constant-voltage control can be achieved. Since the separate subordinate winding is not required, the transformer can be reduced in size.

The embodiments described above are suitable for the present invention. However, the present invention is not restricted by the embodiments and can be modified in various ways without departing from scope of the present invention. For example, although NMOS are used to construct a synchronous rectifying circuit in the embodiments, p-type MOS (PMOS) may also be employed for the same purpose.

As can be seen from the description of the present invention, NMOS are used in place of the rectifying and commutating diodes of the prior art and the circuit configuration includes a combination of the synchronous rectifying NMOS and a magnetic amplifier for constant-voltage control. Since the heat dissipation using, for example, a radiator is not required, the system size can be reduced. The conversion efficiency can be increased and the system can be easily implemented in a low-voltage multi-output configuration. The diodes can be removed and hence heat generated in the system is reduced. This increases reliability of the system and saves energy consumed by the system. Since the magnetic amplifier is employed to control the secondary side, a highly stable multi-output power source with reduced interference between the outputs can be easily implemented.

By disposing the magnetic amplifier between the secondary winding and the NMOS constituting the rectifying circuit and by arranging a separate subordinate winding other than the secondary winding as the driving circuit of the NMOS of the rectifying circuit, the rectifying circuit is not configured in the loop in which the reset current flows. The magnetic amplifier can achieve constant-voltage control without any influence from the interruption of the control loop when the diode on the rectifying side is turned off.

By arranging a diode causing a small voltage drop in parallel with the body diode of the NMOS constituting the smoothing circuit, the current of the smoothing choke coil flows through the diode during the period in which the magnetic amplifier prevents the on cycle to thereby increase the conversion efficiency.

Since the active clamp circuit is disposed on the primary side of the transformer, the flyback voltage has almost a rectangular waveform when the switching circuit is off. It is therefore guaranteed that the NMOS constituting the smoothing circuit is turned on regardless of input and load variation. Therefore, the transformer has improved usability, for example, can cope with a wide input system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A multi-output switching power supply circuit, comprising:

a dc power source for generating a dc input voltage;

a detecting circuit for detecting a voltage value of a second ac voltage generated by a first subordinate winding, the first subordinate winding constituting a voltage transformer including a primary side, a primary winding, a core, a secondary side, and a secondary winding;

a switching circuit for turning on or off the dc input voltage according to a control signal generated by detecting variation in the voltage value of the second ac voltage and thereby producing a first ac voltage having a predetermined frequency and a pulse width corresponding to the second ac voltage;

a control circuit for generating the control signal according to variation in the voltage value of the second ac voltage detected by said detecting circuit;

an active clamp circuit for passing an exciting current through the primary winding of said voltage transformer during an off period of said switching circuit and for thereby resetting the core of said voltage transformer, said dc power source, said detecting circuit, said switching circuit, said control circuit, and said active clamp circuit being arranged on the primary side of said voltage transformer; and a plurality of output sections disposed on the secondary side of said voltage transformer, each of said output sections comprising:

a magnetic amplifier for controlling, according to a reset current, on or off of a third ac voltage generated on the secondary winding through voltage conversion of the first ac voltage by said voltage transformer and for thereby generating a fourth ac voltage having a pulse width corresponding to the reset current;

a rectifying circuit for rectifying the fourth ac voltage into a pulsating voltage;

a smoothing circuit for smoothing the pulsating voltage into a dc output voltage and for applying the dc output voltage to a load; and a voltage control circuit for detecting variation in the dc output voltage and for generating the reset current to conduct negative feedback control for the fourth ac voltage, wherein:

said rectifying circuit comprises a first NMOS transistor which is turned on or off according to a voltage value of a fifth ac voltage generated on a second subordinate winding disposed on the secondary side of said voltage transformer and which thereby generates the pulsating voltage;

said smoothing circuit comprises:

a smoothing capacitor for smoothing the pulsating voltage into the de output voltage and for applying the dc output voltage to a load;

a choke coil for accumulating electromagnetic energy associated with the pulsating voltage; and a second NMOS transistor which turns on, when said first NMOS transistor is off, according to a voltage value of a sixth ac voltage generated on a third subordinate winding disposed on the secondary side of said voltage transformer and which thereby supplies the electromagnetic energy from the choke coil to the smoothing capacitor; and said magnetic amplifier is arranged between the secondary winding and said first NMOS transistor.

2. A multi-output switching power supply circuit, comprising:

a dc power source for generating a dc input voltage;

a detecting circuit for detecting a voltage value of a second ac voltage generated by a first subordinate winding, the first subordinate winding constituting a voltage transformer including a primary side, a primary winding, a core, a secondary side, and a secondary winding;

a switching circuit for turning on or off the dc input voltage according to a control signal generated by detecting variation in the voltage value of the second ac voltage and thereby producing a first ac voltage having a predetermined frequency and a pulse width corresponding to the second ac voltage;

a control circuit for generating the control signal according to variation in the voltage value of the second ac voltage detected by said detecting circuit and a level of a detection signal detected by a voltage variation detecting circuit;

an active clamp circuit for passing an exciting current through the primary winding of said voltage transformer during an off period of said switching circuit and for thereby resetting the core of said voltage transformer;

said dc power source, said detecting circuit, said switching circuit, said control circuit, and said active clamp circuit being arranged on the primary side of said voltage transformer;

a main output section disposed on the secondary side of said voltage transformer, comprising:

a first rectifying circuit for rectifying a seventh ac voltage generated on a first secondary winding through voltage conversion of the first ac voltage by said voltage transformer and for thereby generating a first pulsating voltage;

a first smoothing circuit for smoothing the first pulsating voltage into a first dc output voltage and for applying the first dc output voltage to a load; and the voltage variation detecting circuit for detecting variation in the first dc output voltage into a detection signal and for supplying the detection signal to said control circuit; and a plurality of output sections disposed on the secondary side of said voltage transformer, each of said output sections comprising:

a magnetic amplifier for controlling, according to a reset current, on or off of an eighth ac voltage generated on the secondary winding through voltage conversion of the first ac voltage by said voltage transformer and for thereby generating a ninth ac voltage having a pulse width corresponding to the reset current;

a second rectifying circuit for rectifying the ninth ac voltage into a second pulsating voltage;

a second smoothing circuit for smoothing the second pulsating voltage into a second dc output voltage and for applying the second dc output voltage to a load; and a voltage control circuit for detecting variation in the second dc output voltage and for generating the reset current to conduct negative feedback control for the ninth ac voltage, wherein:

said first rectifying circuit comprises a first NMOS transistor which turns the seventh ac voltage on or off at timing synchronized with switching timing of said switching circuit and which thereby generates the first pulsating voltage;

said smoothing circuit comprises:

a first smoothing capacitor for smoothing the first pulsating voltage into the first dc output voltage and for applying the first dc output voltage to a load;

a first choke coil for accumulating electromagnetic energy associated with the first pulsating voltage; and a second NMOS transistor which turns on when said first NMOS transistor is off, and which thereby supplies the electro-magnetic energy from the choke coil to the smoothing capacitor;

said second rectifying circuit comprises a third NMOS transistor which is turned on or off according to a voltage value of a tenth ac voltage generated on the second subordinate winding disposed on the secondary side of said voltage transformer;

said second smoothing circuit comprises:

a second smoothing capacitor for smoothing the second pulsating voltage into the second dc output voltage and for applying the second dc output voltage to a load;

a second choke coil for accumulating electromagnetic energy associated with the second pulsating voltage; and a fourth NMOS transistor which turns on, when said third NMOS transistor is off, according to a voltage value of an 11th ac voltage generated on a third subordinate winding disposed on the secondary side of said voltage transformer and which thereby supplies the electromagnetic energy from the second choke coil to the second smoothing capacitor; and said magnetic amplifier is arranged between the secondary winding and said third NMOS transistor.

3. A multi-output switching power supply circuit, comprising:

a dc power source for generating a dc input voltage;

a detecting circuit for detecting a voltage value of a second ac voltage generated by a first subordinate winding, the first subordinate winding constituting a voltage transformer including a primary side, a primary winding, a core, a secondary side, and a secondary winding;

a switching circuit for turning on or off the dc input voltage according to a control signal generated by detecting variation in the voltage value of the second ac voltage and thereby producing a first ac voltage having a predetermined frequency and a pulse width corresponding to the second ac voltage;

a control circuit for generating the control signal according to variation in the voltage value of the second ac voltage detected by said detecting circuit and a level of a detection signal detected by a voltage variation detecting circuit;

an active clamp circuit for passing an exciting current through the primary winding of said voltage transformer during an off period of said switching circuit and for thereby resetting the core of said voltage transformer, said dc power source, said detecting circuit, said switching circuit, said control circuit, and said active clamp circuit being arranged on the primary side of said voltage transformer; and an output section disposed on the secondary side of said voltage transformer, comprising:

a magnetic amplifier for controlling, according to a reset current, on or off of a third ac voltage generated on the secondary winding through voltage conversion of the first ac voltage by said voltage transformer and for thereby generating a fourth ac voltage having a pulse width corresponding to the reset current;

a rectifying circuit for rectifying the fourth ac voltage into a pulsating voltage;

a smoothing circuit for smoothing the pulsating voltage into a dc output voltage and for applying the dc output voltage to a load; and a voltage control circuit for detecting variation in the dc output voltage and for generating the reset current to conduct negative feedback control for the fourth ac voltage, wherein:

said rectifying circuit comprises a first NMOS transistor which turns the third ac voltage on or off at timing synchronized with switching timing of said switching circuit and which thereby generates the pulsating voltage;

said smoothing circuit comprises:

a smoothing capacitor for smoothing the pulsating voltage into the dc output voltage and for applying the dc output voltage to a load;

a choke coil for accumulating electromagnetic energy associated with the pulsating voltage; and a second NMOS transistor which turns on when said first NMOS transistor is off, and which thereby supplies the electro-magnetic energy from the choke coil to the smoothing capacitor;

said first NMOS transistor includes a gate electrode, a source electrode, and a drain electrode, said gate electrode being connected to a winding end side of the secondary winding, said source electrode being linked with a ground side, said drain electrode being coupled with a winding start side of the secondary winding;

said second NMOS transistor includes a gate electrode, a source electrode, and a drain electrode, said gate electrode being connected to the winding start side of the secondary winding, said source electrode being linked with a ground side, said drain electrode being coupled with an output port of said magnetic amplifier;

said magnetic amplifier is arranged between the gate electrode of said first NMOS transistor and the drain electrode of said second NMOS transistor; and the reset current is supplied to a winding start side of said reset winding and is outputted to the ground side.

4. The multi-output switching power supply circuit in accordance with claim 1, further comprising a diode having a small voltage drop in a stage after said second NMOS transistor in parallel with said second NMOS transistor.

5. The multi-output switching power supply circuit in accordance with claim 2, further comprising a diode having a small voltage drop in a stage after said second NMOS transistor in parallel with said second NMOS transistor.

6. The multi-output switching power supply circuit in accordance with claim 3, further comprising a diode having a small voltage drop in a stage after said second NMOS transistor in parallel with said second NMOS transistor.

7. The multi-output switching power supply circuit in accordance with claim 1, wherein said active clamp circuit comprises:

a capacitor connected to a winding end side of the primary winding of said voltage transformer; and an NMOS transistor including a gate electrode, a source electrode, and a drain electrode, said gate electrode being connected to a signal delivered from said control circuit, said signal being opposite in phase to the control signal generated from said control circuit; said source electrode being coupled with an output from said switching circuit, said drain electrode linked with said capacitor, the signal opposite in phase to the control signal generated from said control circuit having deadtime preventing an event in which said switching circuit and said NMOS are on at the same time.

8. The multi-output switching power supply circuit in accordance with claim 2, wherein said active clamp circuit comprises;

a capacitor connected to a winding end side of the primary winding of said voltage transformer; and an NMOS transistor including a gate electrode, a source electrode, and a drain electrode, said gate electrode being connected to a signal delivered from said control circuit, said signal being opposite in phase to the control signal generated from said control circuit; said source electrode being coupled with an output from said switching circuit, said drain electrode linked with said capacitor, the signal opposite in phase to the control signal generated from said control circuit having deadtime preventing an event in which said switching circuit and said NMOS are on at the same time.

9. The multi-output switching power supply circuit in accordance with claim 3, wherein said active clamp circuit comprises:

a capacitor connected to a winding end side of the primary winding of said voltage transformer; and an NMOS transistor including a gate electrode, a source electrode, and a drain electrode, said gate electrode being connected to a signal delivered from said control circuit, said signal being opposite in phase to the control signal generated from said control circuit; said source electrode being coupled with an output from said switching circuit, said drain electrode linked with said capacitor, the signal opposite in phase to the control signal generated from said control circuit having deadtime preventing an event in which said switching circuit and said NMOS are on at the same time.

10. The multi-output switching power supply circuit in accordance with claim 1, wherein said third ac voltage has a pulse width necessary for saturation of said magnetic amplifier.

11. The multi-output switching power supply circuit in accordance with claim 3, wherein said third ac voltage has a pulse width necessary for saturation of said magnetic amplifier.

12. The multi-output switching power supply circuit in accordance with claim 2, wherein said eighth ac voltage has a pulse width necessary for saturation of said magnetic amplifier.

* * * * *